(12) United States Patent
Brown et al.

(10) Patent No.: US 7,588,738 B2
(45) Date of Patent: Sep. 15, 2009

(54) SERIES CATALYST BEDS

(75) Inventors: Stephen Harold Brown, Bernardsville, NJ (US); Jon Edmond Randoph Stanat, Baton Rouge, LA (US); Jose Manuel Vargas, Prairieville, LA (US); Stephen W. Beadle, Prairieville, LA (US); Georges Marie K. Mathys, Bierbeek (BE); John Stephen Godsmark, Grez Doicheau (BE); Raphael Frans Caers, Edegem (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 715 days.

(21) Appl. No.: 11/209,942

(22) Filed: Aug. 23, 2005

(65) Prior Publication Data

US 2007/0049781 A1    Mar. 1, 2007

(51) Int. Cl.
*B01J 8/04*      (2006.01)
*C07C 2/04*      (2006.01)

(52) U.S. Cl. .................. 422/190; 422/197; 422/199; 422/200; 585/514; 585/517

(58) Field of Classification Search .............. 422/190, 422/197, 199, 200; 585/514, 515, 517
See application file for complete search history.

(56) References Cited

U.S. PATENT DOCUMENTS

| | | | |
|---|---|---|---|
| 2,102,073 A | 12/1937 | Ipatieff et al. | |
| 3,759,820 A | 9/1973 | Boyd | |
| 4,206,180 A * | 6/1980 | Campbell et al. | 422/190 |
| 4,487,985 A | 12/1984 | Tabak | 585/517 |
| 4,547,609 A | 10/1985 | Dessau | 585/517 |
| 4,560,536 A | 12/1985 | Tabak | |
| 4,618,737 A | 10/1986 | Chester et al. | |
| 4,709,111 A * | 11/1987 | Ward | 585/503 |
| 4,740,645 A * | 4/1988 | Garwood et al. | 585/329 |
| 4,788,366 A * | 11/1988 | Harandi et al. | 585/314 |
| 4,919,896 A | 4/1990 | Harandi et al. | 422/142 |
| 5,030,789 A * | 7/1991 | Dang Vu et al. | 585/503 |
| 5,177,279 A | 1/1993 | Harandi | 585/312 |
| 5,177,282 A | 1/1993 | Nierlich et al. | 585/329 |
| 5,540,899 A * | 7/1996 | Koves | 422/200 |
| H001800 H * | 8/1999 | Salinas et al. | 570/243 |
| 5,932,141 A * | 8/1999 | Rostrop-Nielsen et al. | 252/373 |
| 6,025,533 A | 2/2000 | Vora et al. | |
| 6,072,093 A * | 6/2000 | O'Neill et al. | 585/514 |

(Continued)

FOREIGN PATENT DOCUMENTS

WO    WO 01/83407     11/2001
WO    WO 2005/058777   6/2005

OTHER PUBLICATIONS

Hengstebeck, "Petroleum Processing", McGraw-Hill (1959), pp. 208-234.
EMOGAS Technology for Catpoly Units, presented at the National Petrochemical & Refiners Association Annual Meeting, Mar. 13-15, 2005, San Francisco, CA.

*Primary Examiner*—N. Bhat
(74) *Attorney, Agent, or Firm*—Andrew B. Griffis

(57) ABSTRACT

The invention relates to series reactor beds containing different oligomerization catalysts and having independent temperature control, and processes for the oligomerization of light olefins to heavier olefins using such series reactor beds.

5 Claims, 4 Drawing Sheets

U.S. PATENT DOCUMENTS

| | | | |
|---|---|---|---|
| 6,143,942 A | 11/2000 | Verrelst et al. | 585/533 |
| 6,770,791 B2 | 8/2004 | Mathys et al. | 585/327 |
| 6,875,899 B2 | 4/2005 | Martens et al. | 585/327 |
| 2003/0133858 A1 | 7/2003 | Le | 422/201 |
| 2004/0254402 A1* | 12/2004 | Sioli | 568/472 |
| 2005/0061490 A1 | 3/2005 | Filippi et al. | 165/145 |

* cited by examiner

SERIES CATALYST BEDS

FIELD OF THE INVENTION

The invention relates to tubular and/or chamber reactors comprising a series of catalyst beds and to the use of a series of fixed catalyst beds for the oligomerization of light olefins to heavier olefins.

BACKGROUND OF THE INVENTION

Olefin streams containing light olefins, such as C3 to C5 olefins, may be used as feed for oligomerization units, forming dimers, trimers and other oligomers (low molecular weight polymers). The formation of these oligomers is conveniently accomplished using catalysts such as nickel or solid phosphoric acid (SPA). The product may be used as-is (e.g., as process fluid or gasoline blending stock) or converted to a variety of alkanes, esters, aldehydes, alcohols and acids for use as intermediates or end-products, such as detergents and plasticizers.

Two types of fixed bed reactors are typically employed with solid catalysts: chamber and tubular, generally described, for instance, in Hengstebeck, "Petroleum Processing", McGraw-Hill (1959), pp. 208-234.

In a chamber reactor, two or more catalyst beds are incorporated into a single vessel in series. The temperature rise across each bed, due to the reaction, is cooled before the next bed with an external and cooler quench stream. This quench stream is generally predominantly saturated hydrocarbon material and often is the product distilled in the first fractionation tower downstream of the reactors in the process, or vapour condensate from a flash drum located in a similar position. Where a chamber reactor is used the heat produced by the exothermic olefin conversion reactions can be controlled by using a low reactivity hydrocarbon as a recycle from reactor effluent to reactor feedstock and/or as a quench between multiple catalyst beds within the reactor. The use of a chamber reactor for the oligomerization of light olefins to heavier olefins is described, for instance, in U.S. Pat. No. 6,072,093.

Tubular reactors typically are single-pass heat exchangers (e.g., shell-and-tube), with the catalyst normally contained in the tubes. The shell side typically contains a circulating heat exchange fluid. For reasons of more effective heat transfer, it is often preferred to select this fluid such that shell-side conditions can be applied under which the selected fluid at least partly evaporates. A convenient selection is in many instances to use water/steam because inter alia water is readily available, the temperature of the reactor can be controlled by controlling steam pressure, and the system is readily integrated with the water/steam systems typically present in many chemical and petrochemical operations. Water may be substituted by other fluids such as narrow boiling point hydrocarbons or hydrocarbon mixtures (e.g, narrow cut alkanes). The use of tubular reactors for the oligomerization of light olefins to heavier olefins is described, for instance, in U.S. Pat. No. 4,709,111.

See also, generally, WO 2005058777A1, for a discussion of tubular and chamber reactors in the oligomerization of light olefins and other hydrocarbon conversion processes that may be advantageously carried out therein using a variety of catalysts.

The use of molecular sieve catalysts in oligomerization of various feed streams to make olefins, including synergistic effects observed with a dual catalyst system, is known. See, for instance, U.S. Pat. Nos. 6,143,942; 6,770,791; and 6,875,899. However, although reactor design for chemical process is an area of active research and often focuses on approaching isothermal operation—see, for instance U.S. Patent Application Nos. 20030133858, 20040266893, and 20050061490—improvements are still needed in the design of reactors using more than one catalyst.

Other references of interest include U.S. Pat. Nos. 4,487,985; 4,547,609; 4,740,645; 4,919,896; 5,177,279; 5,177,282; and 5,672,800; GB Serial No. 0512377.3 (filed 17 Jun. 2005); and EMOGAS Technology for Catpoly Units, presented at the National Petrochemical & Refiners Association Annual Meeting, Mar. 13-15, 2005, San Francisco, Calif.

It has been observed by the present inventors that the use of zeolites in high throughput, one-pass tubular reactors results in deteriorated selectivity due at least in part to the inability, using current reactors, to control the temperature over the length of the catalyst bed. At least one underlying problem is that more than a desired portion of the total reaction is taking place in the earlier portion of the catalyst bed. One problem to be solved, then, is how to improve the distribution of the reaction over the total available reactor volume. It has further been observed by the present inventors that the performance of catalyst combinations is optimized when each catalyst can be run at a different optimized temperature. Another problem to be solved is to provide a low-cost reactor system providing such a capability.

Reactor design for isothermal operation has in the past focused mainly on tubular reactors and in particular to the temperature control system using their heat exchange fluid. One example of such design is shown in FIG. 1. The heat exchange fluid is assumed to be water. In this and other figures herein, because of the large number of valves they are not shown; however it is within the skill of the ordinary artisan to configure the appropriate valves. Water/steam exiting the reactor (not shown) enters via conduit 1 into (or near) the top of a conventional steam drum 10. The water in conduit 1 either drops into the steam drum 10 or is entrained in the steam produced by the heat of reaction and removed along with steam via conduit 2. The steam and entrained water that exits the steam drum 10 via conduit 2 is replaced by make-up water or boiler feed water (BFW) which is fed into the steam drum 10 via conduit 3, typically entering below the water level illustrated by line 11 in FIG. 1. The water entering conduit 3 typically is deaerated by bringing it close to or up to boiling temperature at about atmospheric pressure, and therefore this water is substantially colder than the water already in the drum, where the pressure is typically higher. Water exiting steam drum 10 via conduit 4 is returned to the reactor. As would be recognized by one of ordinary skill in the art, passage through steam drum 10 is induced by at least one of (i) forced flow, such as by mechanically pumping said water/steam, preferably the water in conduit 4, and (ii) thermosyphon circulation.

A reactor design providing for more isothermal operating conditions has recently been previously described in U.S. patent application Ser. No. 11/140,853, filed May 31, 2005. The invention described therein concerns a reactor system comprising at least one reactor and a drum and having a heat exchange fluid circulating through a first conduit from the reactor to the drum and a second conduit from the drum to the reactor, and wherein a portion of the fluid is removed from the reactor system and makeup fluid is added to the reactor system through a makeup fluid conduit connected to the drum, said drum having a liquid phase and a vapor phase above the liquid phase, the improvement comprising connecting the makeup fluid conduit and the first conduit into the same phase of the drum, e.g., both into the liquid phase or both into the vapor phase above the liquid phase. Embodiments are shown in FIGS. 2 through 4, wherein like numerals indicate like parts throughout the various embodiments.

FIG. 2 illustrates an embodiment of the invention described in the aforementioned application. As shown in FIG. 2, water/steam exiting the reactor (not shown) enters via conduit 1 into (or near) the top of steam drum 10. The water in conduit 1 either drops into the steam drum 10 or is entrained in the steam produced by the heat of reaction and removed along with steam via conduit 2. The steam and entrained water that exits the steam drum 10 via conduit 2 is replaced by make-up water or boiler feed water (BFW) which is fed into the steam drum 10 via conduit 3. According to the invention, the makeup water or BFW in conduit 3 is preheated by the water/steam in conduit 1 prior to entering steam drum 10 into the vapor phase above liquid level 11. In FIG. 2 water exiting steam drum 10 is returned to the reactor via conduit 4. No external source of heat is needed to preheat the BFW water (although that remains an optional choice). In another embodiment shown in FIG. 3, the improvement comprises having the water/steam in conduit 1 (exiting the reactor) entering the steam drum below the interface 11, the same phase for BFW entering from conduit 3. Elements 2, 4, and 10 serve the same function as the like numerals in FIGS. 1 and 2. In yet another embodiment shown in FIG. 4, the water/steam conduit 1 exiting the reactor enters the makeup water line 3 (below water/vapor interface 11) to preheat the makeup water prior to entering the drum 10. As in the other embodiments, water returns to the reactor via conduit 4 and steam exits via conduit 2.

However, in such a reactor system, while two different catalysts may be used, e.g, by stacking one atop the other or by mixing the two catalysts, the temperature selected is necessarily a compromise somewhere between the optimal operating conditions of each individual catalyst.

Solid Phosphoric Acid (SPA) catalyst is particularly useful for producing C13 and lower oligomers, and is particularly highly selective for nonene from propylene, which is highly valued in the Oxo Process to produce plasticizer alcohols (with regard to the Oxo Process, see for example WO2005058787 and WO2003082789A2, which in turn recite numerous references to the same subject matter).

However, SPA catalyst deactivates quickly relative to zeolite catalysts, and fails more quickly at higher temperatures. SPA catalyst swells and agglomerates with time on stream causing a steady erosion of porosity, and must be removed after service by drilling or water jetting. Because SPA catalyst runs are usually terminated due to excessive pressure drop, running SPA catalyst in series reactors is less practical. As far as the present inventors are aware, a previously unrecognized benefit of zeolite catalyst is that zeolites do not build pressure drop with time on stream; this property of zeolites makes the use of zeolites in at least one reactor in a series of reactors particularly attractive.

Unlike solid phosphoric acid, zeolite catalysts typically have a higher selectivity to the desired gasoline boiling range product when operated at a higher temperature (typically 240-260° C.) and also typically produce large amounts of product boiling in the distillate carbon number range when operated at high light olefin conversion at the constant higher temperature (typically 240-260° C.). For this reason (among others), the economics of running a light olefin oligomerization plant with zeolite catalyst are improved by providing the unit operators with the ability to maintain a constant zeolite catalyst activity. Constant zeolite activity can be approached by allowing the temperature of the unit to vary with time.

Thus, each catalyst has it benefits, but clearly a compromise temperature is not the ideal solution when running a dual catalyst system using SPA and zeolites or even two different zeolites.

It would be beneficial if the positive attributes of each catalyst for oligomerization could be combined without the attendant drawbacks. There is a need, particularly, for a method to enable reactor severity control in light olefin polymerization units, to maintain isothermality, and to allow, in the case of a dual catalyst system, each catalyst to operate at optimal activity and selectivity vis-a-vis the desired outcome (e.g., a uniform product or more of the desired products).

The present inventors have surprisingly discovered that a reactor system comprising at least two catalysts beds in series, each catalyst bed having a different catalyst and each catalyst bed provided with independent temperature control, such as with independent steam drums in the case of tubular reactors or separate quench as in the case of chamber reactors, provides for improved performance in oligomerization reactions.

SUMMARY OF THE INVENTION

The invention relates to tubular and/or chamber reactors comprising a series of catalyst beds, wherein at least two catalyst beds in series have different catalyst and the catalyst beds are provided with independent temperature control. The catalyst beds are optionally equipped with distributors to allow interstage injection of fresh feed, inert diluent, recycle streams, and combinations thereof.

The invention also relates to a process for the oligomerization of light olefins to heavier olefins using a series of fixed catalyst beds wherein at least two catalyst beds in series have different catalyst and the catalyst beds are provided with independent temperature control. In a preferred embodiment, the series catalyst beds comprise: (i) a series of tubular reactors, (ii) at least one chamber reactor having a series of catalyst beds, (iii) or a combination thereof.

In a preferred embodiment, at least two catalyst beds arranged or piped in series, more preferably in the form of at least two tubular reactors, are loaded with different catalysts selected from zeolite catalysts active for the oligomerization of light olefins to heavier olefins and SPA catalyst. In a preferred embodiment, a first tubular reactor comprises zeolite catalyst and a second tubular reactor in series comprises SPA catalyst. In another preferred embodiment, a first catalyst bed, preferably in the form of a first tubular reactor, is packed with a first zeolite catalyst and a second catalyst bed, preferably in the form of a second tubular reactor, piped in series with the first catalyst bed, is packed with a second zeolite catalyst, the first and second zeolite catalysts being different. In a more preferred embodiment, a first catalyst bed is packed with a sulfur-tolerant catalyst, such as ZSM-22, and a second catalyst bed is packed with a catalyst that is less sulfur-tolerant, such as ZSM-57.

The invention also relates to a process comprising retrofitting existing units using the standard parallel tubular reactor design to provide and/or arrive at plural tubular reactors piped in series. In preferred embodiments, zeolite catalyst is used in at least one reactor.

In another embodiment, a chamber reactor and tubular reactor are piped in series, wherein a first catalyst is used in the chamber reactor (and/or the chamber reactor's multiple catalyst beds have one or more different catalysts therein) and a second catalyst is used in the tubular reactor, wherein the first and second catalysts are different. This is particularly useful in the case of a retrofit, wherein a chamber reactor is piped in series with an existing tubular reactor or a tubular reactor is piped in series with an existing chamber reactor.

In embodiments, the series of catalyst beds may be used for a process for oligomerizing light olefins to heavier olefins, for mogas production, for distillate production, using the reactor system according to the invention.

It is an object of the invention to provide a reactor design optimized for use of two or more catalysts, particularly a SPA catalyst and a zeolite catalyst or two different zeolite catalysts.

It is another object of the invention to provide a reactor system having the desired features of isothermal operation, independent temperature control of each catalyst bed, and optional feed composition flexibility.

It is still another object of the invention to provide a method whereby two catalysts having different optimal operating conditions can be utilized to provide an improved oligomerization product.

It is yet another object of the invention to enable high conversion in a single pass of light olefins to heavier of olefins while maintaining isothermality throughout the entire reactor system.

These and other objects, features, and advantages will become apparent as reference is made to the following detailed description, preferred embodiments, examples, and appended claims.

BRIEF DESCRIPTION OF THE DRAWINGS

In the accompanying drawings, like reference numerals are used to denote like parts throughout the several views.

DETAILED DESCRIPTION

Figure 2:
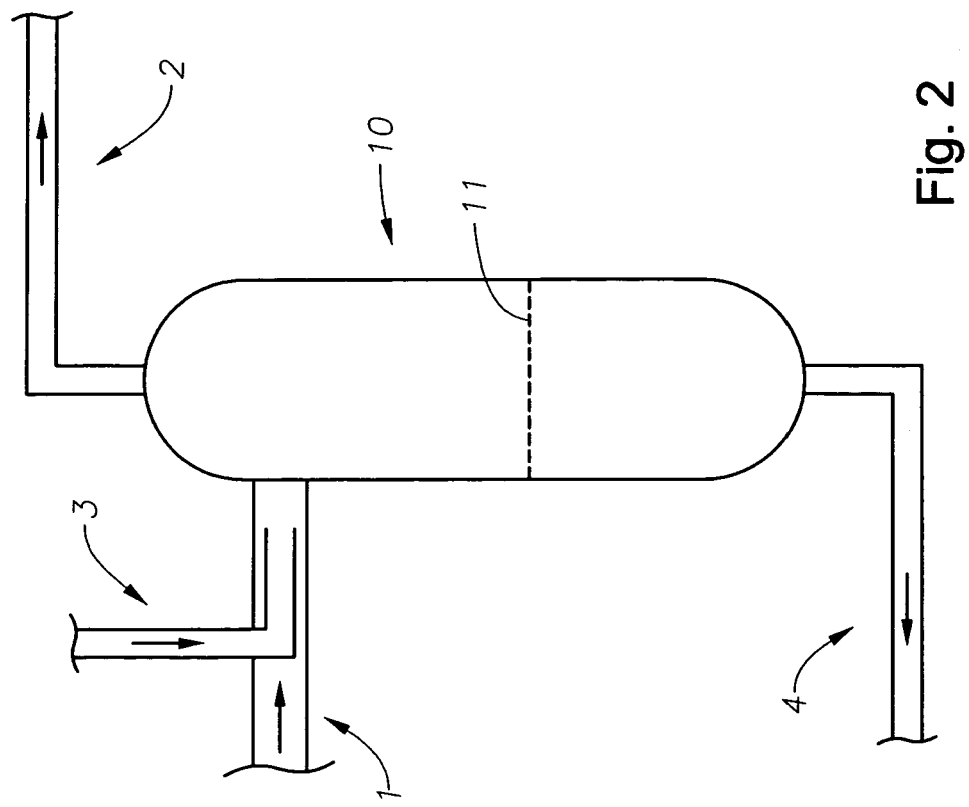
FIGS. 1-4 are partial process flow diagrams illustrating the prior art with respect to makeup water addition to a steam drum.
Figure 1:
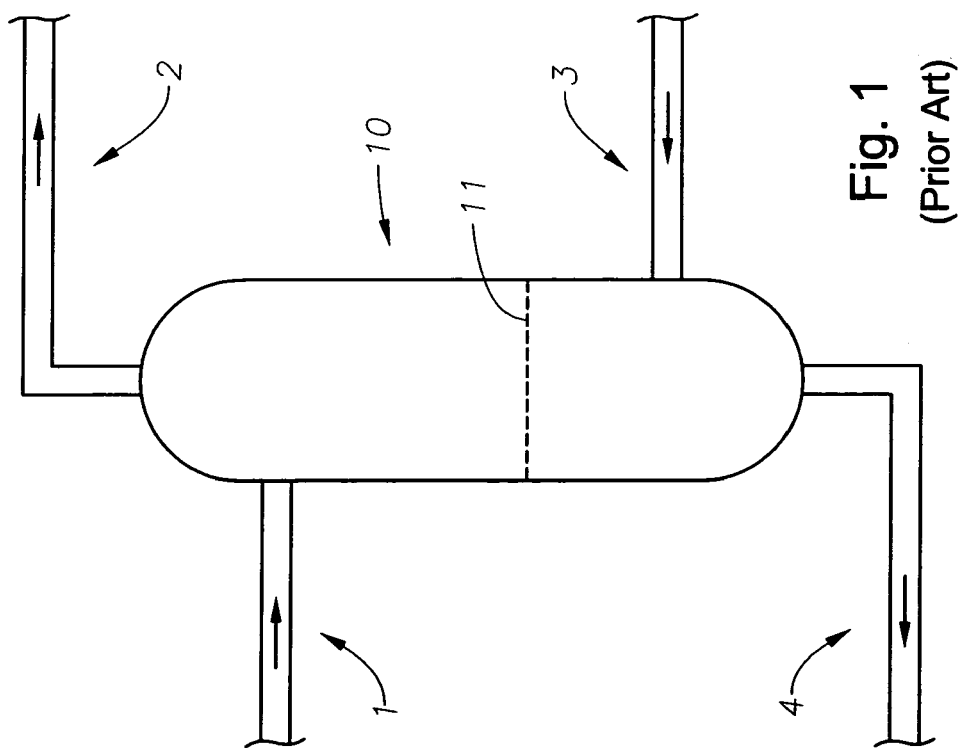
Figure 4:
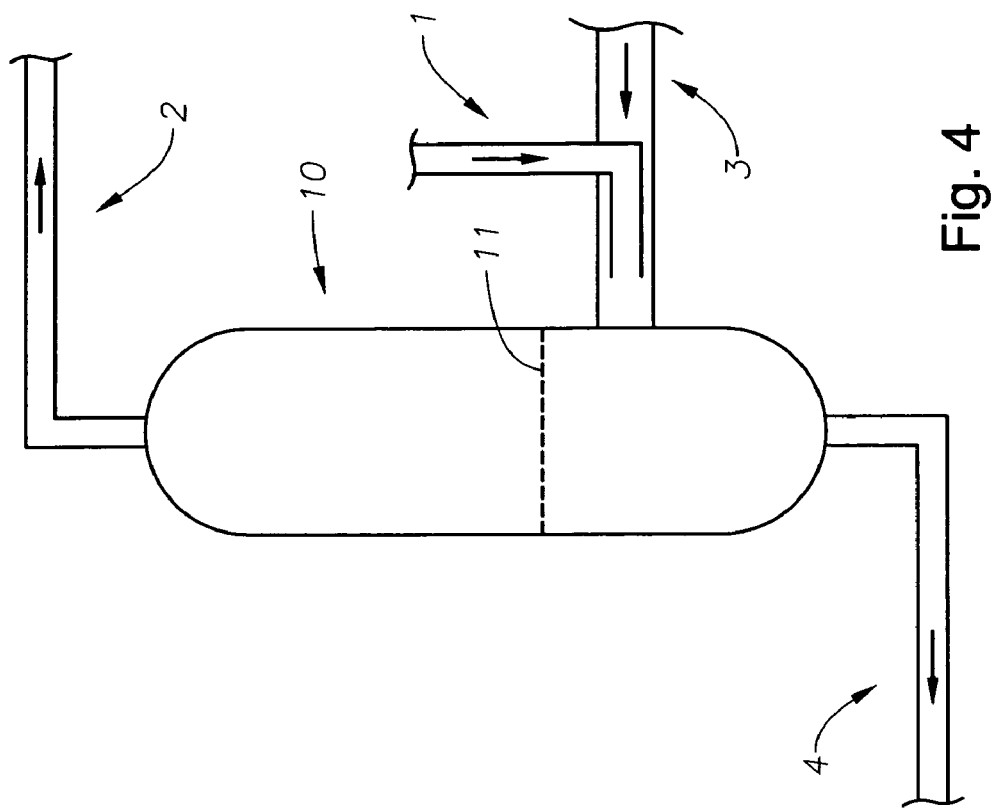
Figure 3:
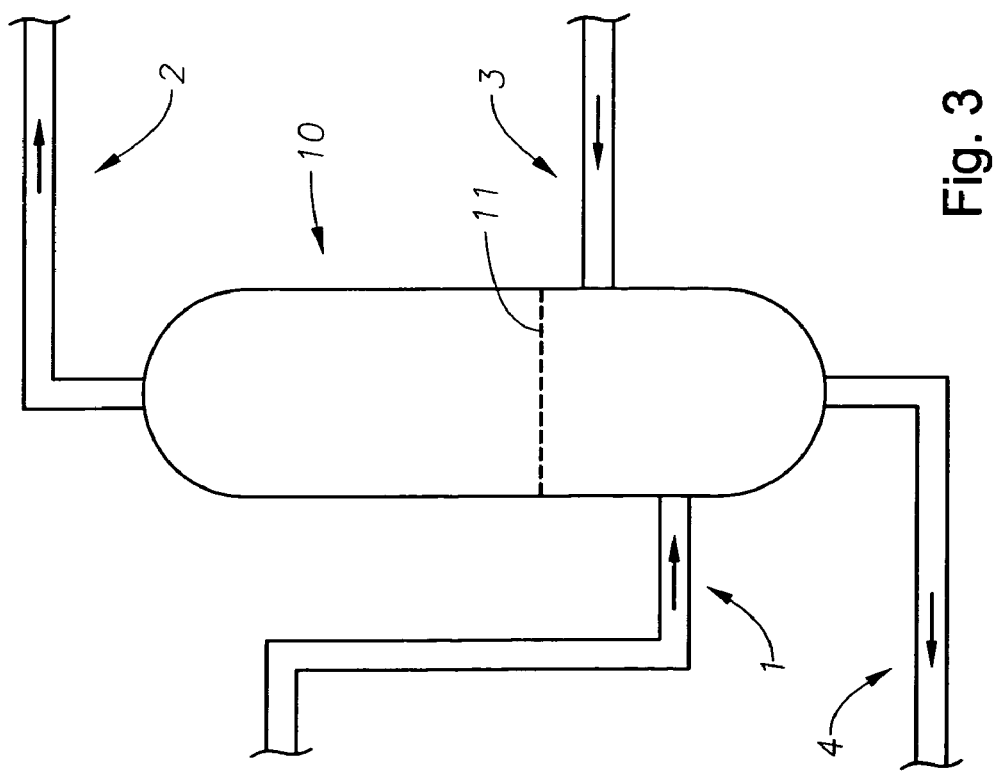

The invention relates to two or more fixed catalyst beds arranged or piped in series, wherein at least two of the catalyst beds in series are provided with different catalysts and independent control of temperature. The catalyst beds are optionally equipped with distributors to allow interstage injection of fresh feed and/or diluent and/or recycle streams. Examples of interstage injection of fresh feed and/or diluent and/or recycle streams are set forth in FIGS. 5 and 6, discussed in detail below.

The term "different catalyst" as used herein can take one or more of several meanings. The difference may be characterized by a different chemical formula and more preferably different chemical elements (e.g., SPA catalyst versus ZSM-22 versus TiO2 dispersed on a monolayer of SiO2 on an alumina support versus NiO on silica/alumina support). The difference may also be characterized by a different activity and/or selectivity profile in oligomerisation reactions when the catalysts are fresh (as opposed to a difference in activity and/or selectivity due to a difference in age). The difference may also be characterized by a difference in crystal structure, crystal size, in surface treatment, in catalyst formulation such as in the choice of binder or in the ratio of active matter versus binder concentration. The difference may also be characterized by a difference in sensitivities to certain components that may affect catalyst activity and/or selectivity, such as sulphur components. The difference, however, will not be characterized solely by a difference attributable to aging (such as solely by the amount of coke or other substances that have been built up on the surface due to activity).

As still a further characterization of the present invention, it will be mentioned that one or more of the series catalyst beds may have a mixture of catalysts therein or they may have two or more stacked catalysts packed, and the apparatus according to the invention may comprise a first catalyst bed comprising a physical mixture of a first and second catalyst and a second catalyst bed comprising said first catalyst stacked in series with said second catalyst.

In embodiments, the series catalyst beds are used in a process for the oligomerization of light olefins to heavier olefins and/or the series catalyst beds comprise: (i) a series of tubular reactors, (ii) at least one chamber reactor having a series of plural catalyst beds, (iii) or a combination thereof.

In a preferred embodiment, at least two catalyst beds arranged or piped in series, more preferably in the form of at least two tubular reactors, are loaded with different catalysts selected from zeolite catalysts active for the oligomerization of light olefins to heavier olefins and SPA catalyst. In a preferred embodiment, a first tubular reactor comprises zeolite catalyst and a second tubular reactor in series comprises SPA catalyst. In another preferred embodiment, a first catalyst bed, preferably in the form of a first tubular reactor, is packed with a first zeolite and a second catalyst bed, preferably in the form of a second tubular reactor, piped in series with the first catalyst bed, is packed with a second zeolite, the first and second zeolites being different. In a more preferred embodiment, a first catalyst bed is packed with a catalyst selective for dimerization and a second catalyst bed is packed with a catalyst selective for adding a single monomer unit to a dimer of said monomer unit. In another more preferred embodiment, a first catalyst bed is packed with a sulfur-tolerant catalyst, such as ZSM-22, and a second catalyst bed is packed with a catalyst that is less sulfur-tolerant, such as ZSM-57. In another preferred embodiment, if SPA catalyst is used upstream of a zeolite containing reactor, a bed of sorbent or other material may be provided to remove entrained phosphoric acid if desirable.

In another embodiment, a chamber reactor and tubular reactor are piped in series, wherein a first catalyst is used in the chamber reactor (and/or the chamber reactor's multiple catalyst beds have one or more different catalysts therein) and a second catalyst is used in the tubular reactor, wherein the first and second catalysts are different. This is particularly useful in the case of a retrofit, wherein a chamber reactor is piped in series with an existing tubular reactor or a tubular reactor is piped in series with an existing chamber reactor.

In embodiments, the invention also relates to a process for oligomerizing light olefins, to mogas production, to distillate production, using the reactor system according to the invention or an apparatus containing the same.

The invention also relates to a process comprising retrofitting existing units using the standard parallel tubular reactor design to provide or arrive at plural tubular reactors piped in series. In preferred embodiments, zeolite catalyst is used in at least one reactor. In another preferred embodiment, an existing reactor system is retrofitted by providing a tubular reactor packed with a different catalyst piped in series either upstream or downstream of the existing reactor system. As an example, a tubular reactor packed with a zeolite active for the oligomerization of light olefins to heavier olefins is piped in series upstream of a tubular reactor containing SPA catalyst or an existing chamber reactor containing SPA catalyst.

SPA catalyst operators are accustomed to process operation with significant pressure drop which rises with time on stream. A step-out performance advantage of zeolite reactors for light olefin oligomerization is the ability to run without significant pressure drop, and this throughout the run until the catalyst activity has become unacceptable. The low pressure drop of zeolite catalysts in at least one reactor unexpectedly allows for a retrofit plan that uses a novel series tubular reactor design for light olefin oligomerization plants.

As an alternative to piping a new tubular reactor in series, revalving and repiping may allow a low cost conversion from parallel to series operation. As another alternative, a series of parallel reactors may be retrofitted by adding a second set of parallel reactors in series. Thus, by way of example, 4 parallel reactors may be piped in series with 4 other reactors in series (a "4/4" arrangement) which may optionally feed into a set of finishing reactors, with typically 2 of the downstream reactors feeding into one finishing reactor (a "4/4/2" arrangement). Other arrangements such as a 2/2 or a 3/3 arrangement are possible, and these may be followed by a single or a set of 2 or 3 finishing reactors. It should be noted that one of ordinary skill in the art would recognize that such systems can be appropriately piped and valved in a variety of ways, such as providing for the effluent from each parallel set of reactors to be regrouped before being sent to the next set of parallel reactors in series, in which case the next set of parallel reactors in series would all see the same feed. By not regrouping the effluent, however, the operator can tailor and/or adjust the trailing reactor to the performance of a single lead reactor. The tubular reactor system of the invention provides the desired features of isothermal operation, independent temperature control, and feed composition flexibility.

Chamber reactors may be packed (or repacked) so that at least two of the reactor beds are packed with different catalysts. Alternatively, two chamber reactors may be arranged in series. The quench system of a chamber reactor may inherently provide for independent temperature control in each catalyst bed, and hence also in each reactor. The quench is typically a diluent, recycle, or reactant in low concentration, or a mixture thereof. In a typical chamber reactor, 5 beds are provided in series. According to the present invention, at least two of the beds will be provided with different catalyst. In another embodiment, a chamber reactor system may be retrofitted to provide a tubular reactor or a second chamber reactor in series and packed with a different catalyst than the existing chamber reactor.

The advantages offered by the present invention are most preferably seen when applied to the oligomerization of light olefins, particularly C3 to C5 alpha olefins and mixtures thereof, to make heavier olefins, particularly dimers, trimers and tetramers of said light olefins, and more particularly to produce a product comprising C6 to C13 olefins. In a preferred embodiment, the process will comprise feeding a hydrocarbon stream comprising C3-C5 olefins in a higher olefins reactor comprising a steam boiler coupled with a first light olefin oligomerization reactor packed with a first catalyst in series with a steam boiler coupled with a second light olefin oligomerization reactor packed with a second catalyst, wherein said first and second catalyst are different, and preferably wherein said first catalyst is selective for dimerization and said second catalyst is selective for adding a monomer unit to a dimer of said monomer unit. The process of the invention is also readily adaptable to processes comprising oligomerization of olefin feeds containing one or more C2-C10 olefins, for example C4-C10 internal- or α-olefins, or processes producing one or more C6-C20 oligomerization products or one or more C6-C13 oligomerization products from appropriate feeds.

In one embodiment, the olefin feeds, e.g., light olefins, are obtained by the conversion of an oxygenate, such as methanol, to olefins over either silicoaluminophosphate (SAPO) catalyst, according to the method of, for example, U.S. Pat. Nos. 4,677,243 and 6,673,978, or an aluminosilicate catalyst, according to the method of, for example, WO04/18089, WO04/16572, EP 0 882 692 and U.S. Pat. No. 4,025,575. Alternatively, the light olefins can be obtained by the catalytic cracking of relatively heavy petroleum fractions, or by the pyrolysis of various hydrocarbon streams, ranging from ethane to naphtha to heavy fuel oils, in admixture with steam, in a well understood process known as "steam cracking".

Preferred processes used for the oligomerization of light olefins which may be modified by adopting the reactor system according to the invention include those set forth in U.S. Pat. Nos. 4,855,527, 4,855,528, 5,073,658, 5,108,970, 5,112,519, 5,169,824, 5,234,875, 5,260,501, 5,284,989, 5,672,800, 5,731,486, 5,783,168, 5,866,096, 6,013,851, 6,143,942, 6,300,536, 6,884,916, Canadian Patent No. 2,103,587, WO 01/83407, WO 93/25476 A1, and WO 2005058777A1.

In a preferred embodiment the oligomerization process of the invention occurs in at least two tubular reactors in series, wherein the catalyst system of each reactor is characterized as different from the catalyst system of the other reactor, and wherein the oligomerization reaction in each catalyst bed occurs under supercritical (dense phase) conditions, preferably at a temperature of about 160° C. to about 300° C. (more preferably 160° C. to about 260° C.) and pressure of about 900 to about 1200 psig.

Without wishing to be limiting, processes that would benefit from implementation of the present invention include those oligomerization processes that provide to the polymerization reactor, in addition to the olefin feed, a recycle derived from the reaction product including, for example, one of the materials selected from lower molecular weight oligomers (e.g., separated from higher molecular weight oligomers formed in the reaction product), saturates (such as propane or butane that may have introduced along with the light olefins or formed in the oligomerization reaction) and unreacted olefin feed (e.g., unreacted light olefins that were not converted in the oligomerization reaction and that were separated from the overall effluent exiting the reactor). These may include the oligomerization processes noted above, and also notably those processes that employ a recycle of lower molecular weight oligomers to form additional higher molecular weight olefins, and in particular to the production of distillate products. Distillate products are defined herein as comprising at least two different hydrocarbon carbon number molecules in the range of C8-C36.

In general, distillate product is typified by the boiling ranges and compositions common to conventional petroleum derived hydrocarbon streams such as kerosene, jet fuel and automotive diesel oil, and is fit for such uses. Conveniently, in an embodiment of the present invention, distillate product comprises over 90 wt % C9-C20 hydrocarbons, such as over 95 wt % C9-C20 branched olefins. Exemplary disclosures of such processes include U.S. Pat. Nos. 4,444,988, 4,520,221 and 4,720,600, and WO03/82780.

Distillate may also include linear and/or branched paraffinic, aromatic and naphthenic species, and all or a portion of the olefinic distillate product obtained from the reaction product may further be saturated with hydrogen, partially or substantially completely, by methods per se well known to the skilled artisan.

By way of further non-limiting example, another process that would benefit from the implementation of the present invention is the manufacture of mogas. As defined herein, mogas comprises at least two different hydrocarbon number molecules in the range of C4-C12. In general, mogas is typified by the boiling range and composition common to conventional petroleum derived motor gasoline fuel used in the function of internal combustion engines. Conveniently, in the present invention, mogas comprises over 80 wt % C5-C11 hydrocarbons, such as over 90 wt % C5-C10 olefins, saturates or aromatics or mixtures thereof. Exemplary disclosures of such processes include U.S. Pat. Nos. 4,444,988 and 4,520,221 (noted above, which co-manufacture mogas along with distillate product), and U.S. Pat. Nos. 3,899,544 and 4,058,576, directed to the conversion of alcohols and ethers to mogas.

Circulation of the heat exchange fluid in a tubular reactor that is part of the reactor system comprising at least two reactors in series may be induced by forced flow, such as by mechanically pumping the fluid through the system or by use of a compressor, or the circulation may be thermosyphon (or "thermosiphon") circulation. In preferred embodiments, an object of the invention is to allow the process (tube) side of the one or more tubular reactors to become more isothermal. This is realized by making the typically water/steam (shell) side more isothermal. Thermosyphon flow is driven by density differences between the heavy liquid in the downleg from the steam drum to the reactor shell side and the lighter two phase vapor/liquid (steam/water) mixture in the reactor shell side itself and in the upward leg from the reactor shell side to the steam drum.

The term "isothermal" as used herein means substantially uniform temperature. One of ordinary skill in the art will appreciate that isothermal conditions can be recognized by, for instance, a stable temperature behavior, such as a sinusoidal-type temperature behavior varying by, for instance, ±10° C., over at least a portion of the length of the reactor and preferably substantially the entire length of the reactor once steady-state conditions are achieved. The trend in tubular reactor length is to longer reactors, but currently typical tubular reactors used for the oligomerization of light olefins to heavier olefins will be about 15 feet (about 4.5 meters) to about 100 feet (about 30 meters), or in embodiments about 20 feet (about 6 meters) to about 40 feet (about 12 meters), still more preferably about 20 feet to about 30 feet (about 9 meters). The diameter of each tube in a tubular reactor may be, for instance, about 2 inches (5 cm).

The catalyst provided in the catalyst beds in series typically will be selected from solid phosphoric acid (SPA), nickel catalyst such as NiO on silica/alumina, titanium catalyst such as TiO2 dispersed on a monolayer of SiO2 on alumina support, one or more zeolites, e.g, ZSM-5, ZSM-12, ZSM-22, ZSM-23, ZSM-35, ZSM-57, FAU, Beta, FAU, MCM-22, MCM-23, MCM-41, MCM-49, and MCM-56, which may or may not have metals deposited thereon or therein, and/or may or may not be surface treated, and mixtures of these catalysts.

Other useful catalysts are found in the prior art recited hereinabove.

Figure 5:
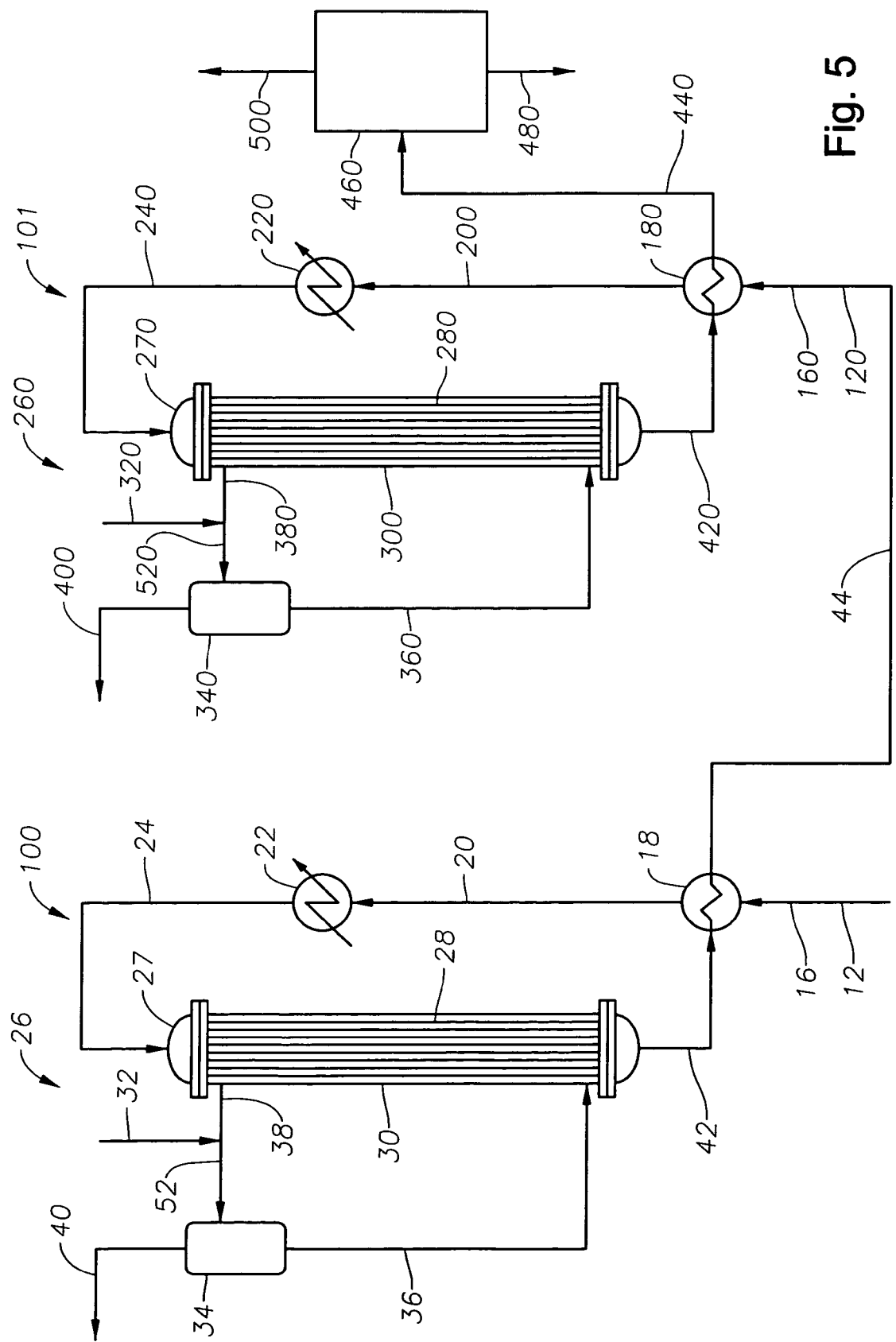
FIGS. 5 and 6 are partial process flow diagrams illustrating examples of applying the method and apparatus of an oligomerization process according to the present invention.

Referring now to FIG. 5, there is shown one embodiment of an oligomerization process according to the invention. In this embodiment, a hydrocarbon composition is produced. The process shown in FIG. 5 employs an olefin oligomerization system 100 comprising a heat exchanger reactor system 26 (further comprising elements 34, 27, 22, 18, and associated piping), in series with an olefin oligomerization system 101, comprising reactor system 260 (further comprising elements 340, 270, 220, 180, and associated piping), along with a separation device 460 (such as a fractionation tower), among other elements. A fresh feedstock stream, such as one containing at least one $C_3$ to $C_8$ olefin, is provided in line 12. Optionally, an amount of inert diluent is added to this olefin stream in order to help in the temperature control. In an embodiment, an olefinic recycle stream (by way of non-limiting example) containing no greater than 10 wt. % $C_{10}$+ olefins may be advantageously provided by a conduit from the separation device 460 to join line 12, wherein the combined feed is shown by line 16. In a preferred embodiment, the mass ratio of the flow of olefinic recycle to the flow of fresh feed in line 12 is at least 0.5 and no greater than 2.0. The feed (optionally combined materials) are provided via line 16 to optional feed/effluent heat exchanger 18 to form a first heated reactor feed in line 20. The first heated reactor feed in line 20 is passed through an optional preheat exchanger 22 to form a second heated combined reactor feed in line 24. The unnumbered line through optional preheat exchanger 22 represents a heating medium, for example 900 psig (6310 kPa) steam, and the second heated reactor feed in line 24 should be at a higher temperature than the first heated combined reactor feed in line 20, but have a temperature no greater than the desired oligomerization reaction temperature in heat exchanger reactor 27.

The second heated combined reactor feed in line 24 is provided to heat exchanger reactor 27, where it flows through plural tubes 28, coming into contact with catalyst contained within the tubes 28. By way of example, the rate of flow of the second heated combined reactor feed in line 24 and amount of catalyst within the tubes 28 of heat exchanger reactor 27 are such that a WHSV of at least 2.3 is achieved, based on the content of olefin in the second heated combined reactor feed in line 24 and the catalyst. The catalyst may be selected from catalysts active for an oligomerization reaction. Thus, the catalyst packed in the tubes typically will be selected from solid phosphoric acid (SPA), NiO on silica/alumina, TiO2 dispersed on a monolayer of SiO2 on alumina support, one or more zeolites, e.g, ZSM-5, ZSM-22, ZSM-23, ZSM-35, ZSM-57, MCM-22, MCM-23, MCM-41, MCM-49, and MCM-56, which may or may not have metals deposited thereon or therein, and mixtures of these catalysts. Preferably the catalyst will be selected from a molecular sieve, particularly a zeolite, and SPA.

The oligomerization reaction thus occurs within tubes 28, generating heat, which passes through the walls of tubes 28 to be absorbed typically by boiling water flowing around the outside of the tubes in shell side 30 of the reactor 27. The boiling water in shell side 30 is a mixture of steam and liquid water that passes through lines 38 and 52 to disengaging vessel 34. Make-up liquid boiler feed water is provided in line 32 in accordance with a preferred embodiment, and combined with the mixture of steam and liquid water coming through line 38 prior to proceeding to disengaging vessel 34 via line 52. The liquid water formed in the disengaging vessel 34 from the steam and liquid water that came through line 52 exit the bottom of disengaging vessel 34 through line 36. The steam generated in the heat exchanger reactor 27 emanates from the top of disengaging vessel 34 through line 40, and may be used, for example, to provide heat in fractionation tower reboilers or to drive steam turbines. The liquid water in line 36 is then provided to the shell side of heat exchanger reactor 27 to become the boiling water in shell side 30. While not shown in detail in FIG. 5, the conduits represented by lines 32, 38 and 52 would preferably be oriented and configured in the manner described in U.S. Ser. No. 11/140,053 referred to above, thus ensuring the makeup fluid and the fluid returning to the drum enter into the same phase of the drum, i.e., either both entering the vapor phase above the liquid level or both entering the liquid phase of the drum.

The presence of a relatively pure heat exchange component, such as water, in a boiling state on the shell side 30 provides an almost constant temperature within shell side 30 and can, given other appropriate design considerations of heat exchanger reactor 27, provide for a very close approach to isothermal conditions for the reaction occurring within the tubes 28. The difference between the highest and lowest temperature within and between all tubes 28 in heat exchanger reactor 27 is preferably no greater than 40° F. (22° C.), conveniently no greater than 30° F. (17° C.), or even no greater than 18° F. (10° C.). Further, this configuration of heat exchanger reactor system 26 allows for good control of the reaction temperature within tubes 28 through controlling the pressure within the disengaging vessel 34 (sometimes called a "steam drum"). The pressure in the steam drum 34 controls the temperature at which the water will boil in shell side 30, one of the key factors governing the rate of absorption of the heat of reaction within tubes 28.

As the catalyst in tubes 28 deactivates with time on stream, a given level of conversion of olefins can be maintained by increasing the pressure in steam drum 34, thus increasing the boiling temperature of the fluid in shell side 30, and increasing the temperature of the oligomerization reaction within tubes 28. Of course, the temperature of the boiling fluid in shell side 30 must be kept lower than the desired oligomerization reaction temperature within tubes 28, conveniently at least 5° C. lower, such as at least 10° C. lower, including at least 15° C. lower and even at least 20° C. lower, but typically not exceeding 40° C. lower to reduce the risk of introducing too great a radial temperature gradient within tubes 28 and decreasing the isothermality of the oligomerization reaction within tubes 28.

One consideration for approaching isothermal conditions in heat exchanger reactor 27 (and likewise in corresponding features in reactor 270, discussed further below) is to use a relatively small diameter for the tubes 28 for example, an outside diameter of less than about 3 inches (7.6 cm), conveniently equal to or less than about 2 inches (5.1 cm), in an embodiment less than about 1.5 inches (3.8 cm), and an inside diameter commensurate with the desired pressure rating for the inside of the tubes 28. This provides a relatively small resistance to heat transfer relative to the heat generated per unit volume of reaction space within tubes 28. Another such design consideration is a relatively long length for tubes 28, such as greater than about 5 meters, including greater than about 7 meters, conveniently greater than about 9 meters.

The oligomerization reaction product exits heat exchanger reactor 27 through line 42, and is provided to optional feed/effluent exchanger 18. The cooled reaction product exits feed/effluent exchanger 18 through line 44, and is provided to the second reactor 101. The specific features of second reactor 101 may be identical to those shown in first reactor 100 or they may be different.

The partially oligomerized stream from reactor 100 is provided by line 120, which may be joined (not shown in the figure) by an olefinic recycle stream from separation device 460 to join line 120, wherein the combined feed is shown by line 160. Again, similar as for the first reactor, in an embodiment the mass ratio of the flow of olefinic recycle line to the flow in line 120 is at least 0.5 and in an embodiment no greater than 2.0. The feed (optionally combined materials) are provided via line 160 to optional feed/effluent heat exchanger 180 to form a first heated reactor feed (with respect to reactor 101) in line 200. The first heated reactor feed in line 200 is passed through an optional preheat exchanger 220 to form a second heated combined reactor feed in line 240. The unnumbered line through optional preheat exchanger 220 represents a heating medium, for example 900 psig (6310 kPa) steam, and the second heated reactor feed in line 240 should in the case with a preheat exchanger be at a greater temperature than the first heated combined reactor feed in line 200, but have a temperature no greater than the desired oligomerization reaction temperature in heat exchanger reactor 270.

The second heated combined reactor feed in line 240 is provided to heat exchanger reactor 270, where it flows through plural tubes 280, coming into contact with catalyst contained within the tubes 280. By way of example, the rate of flow of the second heated combined reactor feed in line 240 and amount of catalyst within the tubes 280 of heat exchanger reactor 270 are such that the appropriate WHSV (which may be readily determined by one of ordinary skill in the art in possession of the present disclosure) is achieved. The catalyst may again be selected from catalysts active for an oligomerization reaction. Thus, the catalyst packed in the tubes typically will be selected from solid phosphoric acid (SPA), NiO on silica/alumina, TiO2 dispersed on a monolayer of SiO2 on alumina support, one or more zeolites, e.g., ZSM-5, ZSM-22, ZSM-23, ZSM-35, ZSM-57, MCM-22, MCM-23, MCM-41, MCM-49, and MCM-56, which may or may not have metals deposited thereon or therein, and mixtures of these catalysts. The catalyst in the second reactor 101 is different from the catalyst in the first reactor 100. The catalyst will be selected from a molecular sieve, particularly a zeolite, and SPA catalysts.

The oligomerization reaction thus occurs within tubes 280, generating heat, which passes through the walls of tubes 280 to be absorbed typically by boiling water flowing around the outside of the tubes in shell side 300 of the reactor 270. The boiling water in shell side 300 is a mixture of steam and liquid water that passes through lines 380 and 520 to disengaging vessel 340. Make-up liquid boiler feed water is preferably provided in line 320, in accordance with the present invention, and combined with the mixture of steam and liquid water coming through line 380 prior to proceeding to disengaging vessel 340 via line 520. The liquid water formed in the disengaging vessel 340 from the steam and liquid water that came through line 520 exit the bottom of disengaging vessel 340 through line 360. The steam generated in the heat exchanger reactor 270 emanates from the top of disengaging vessel 340 through line 400, and may be used, for example, to provide heat in fractionation tower reboilers or to make electricity in turbogenerators. The liquid water in line 360 is then provided to the shell side of heat exchanger reactor 270 to become the boiling water in shell side 300. While not shown in detail in FIG. 6, the conduits represented by lines 320, 380 and 520 would preferably be oriented and configured, as for reactor 100, thus ensuring the makeup fluid and the fluid returning to the drum enter into the same phase of the drum, i.e., either both entering the vapor phase above the liquid level or both entering the liquid phase of the drum. The configuration of the makeup fluid and fluid returning to the drum can be the same or different from that for reactor 100, but preferably the configuration for both reactors has the makeup water and reactor return water enter into the same phase of the drum.

Again, the presence of a relatively pure heat exchange component, such as water, in a boiling state on the shell side 300 provides an almost constant temperature within shell side 300 and can, given other appropriate design considerations of heat exchanger reactor 270, provide for a very close approach to isothermal conditions for the reaction occurring within the tubes 280. The difference between the highest and lowest temperature within and between all tubes 280 in heat exchanger reactor 270 is preferably no greater than 40° F. (22° C.), conveniently no greater than 30° F. (17° C.), or even no greater than 18° F. (10° C.). Further, this configuration of heat exchanger reactor system 260 allows for good control of the reaction temperature within tubes 280 through controlling the pressure within the disengaging vessel 340 (sometimes called a "steam drum"). The pressure in the steam drum 340 controls the temperature at which the water will boil in shell side 300, one of the key factors governing the rate of absorption of the heat of reaction within tubes 280.

As the catalyst in tubes 280 deactivates with time on stream, a given level of conversion of olefins can be obtained by increasing the pressure in steam drum 340, thus increasing the boiling temperature of the fluid in shell side 300, and increasing the temperature of the oligomerization reaction within tubes 280. Of course, the temperature of the boiling fluid in shell side 300 must be kept lower than the desired oligomerization reaction temperature within tubes 280, conveniently at least 5° C. lower, such as at least 10° C. lower, including at least 15° C. lower and even at least 20° C. lower, but typically not exceeding 40° C. lower to reduce the risk of introducing too great a radial temperature gradient within tubes 280 and decreasing the axial isothermality of the oligomerization reaction along tubes 280.

The product in line 440 is provided to separation device 460. Separation device 460 may include one or more well known elements, such as fractionation columns, membranes, and flash drums, among other elements, and serves to separate the various components in the cooled reaction product in line 440 into various streams having differing concentrations of components than the cooled reaction product in line 440, including, by way of example, a manufactured distillate product and an olefinic recycle stream containing, in a preferred embodiment, no greater than 10 wt. % C10 olefins which may be added to lines 12 and or 120, as previously described. Additionally, one or more purge streams may be produced by separation device 460 and exit, for example, via lines 480 or 500, either of which may be further process in a variety of ways, such as by passing to second distillation column; numerous variations will be readily apparent to one of ordinary skill in the art in possession of the present disclosure, such as for instance a heart cut stream from separation device 460. Purge streams in line 500 conveniently include streams richer in saturated hydrocarbons than the feedstock stream in line 120, such as a $C_4$-rich stream containing unreacted butylenes and relatively concentrated $C_4$-saturates, or a portion of material of identical or similar composition to that of the olefinic recycle line(s) combining with lines 12 and/or 120. Providing such purge streams is convenient in controlling the concentration of fresh feed olefins provided for reaction in heat exchanger reactors 27 and 270.

Figure 6:
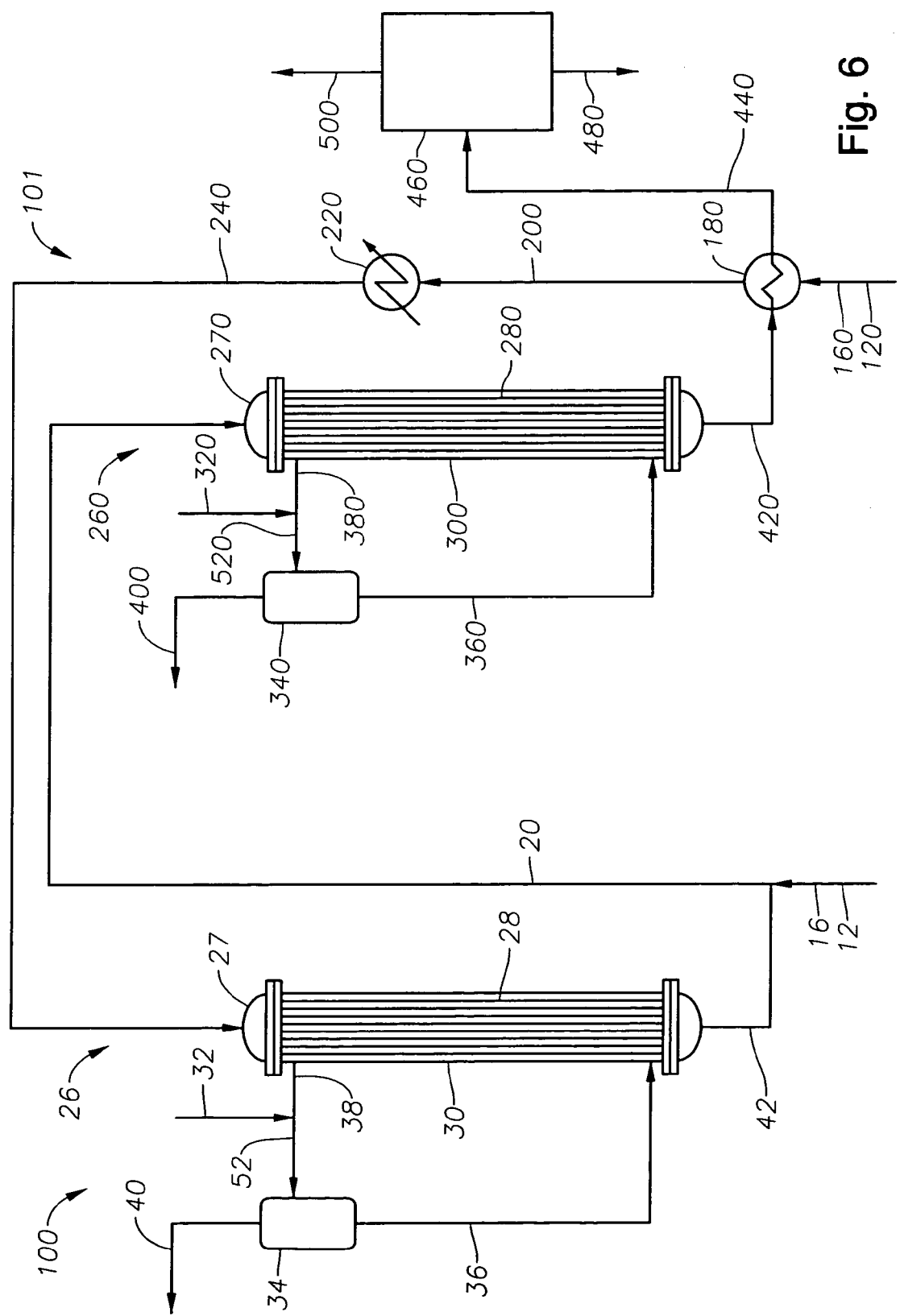

Another embodiment is shown by the partial process flow diagram in FIG. 6. In FIG. 6, like numbers represent like parts illustrated in FIG. 5. The major differences between FIG. 5 and FIG. 6 are as follows: (a) provision for fresh feed, e.g., light olefin feed, into each reactor 100 and 101 is provided by lines 12 and 120, respectively. One or both of these lines may optionally be joined by lines (not shown) containing recycle which combine to form fresh feed/recycle lines 16 and 160, respectively. Numerous other optional modifications will immediately become apparent to one of ordinary skill in the art in possession of the present disclosure such as, by way of further example, providing the ability to adjust the inlet temperature of the second reactor by using a second heat exchanger. Note also that there is only one feed preheater and one feed effluent exchanger in the second series reactor embodiment shown in FIG. 6, which should not be construed as a limitation but merely as exemplary. Again, numerous variations on this schematic will be readily apparent to one of ordinary skill in the art in possession of the present disclosure.

Trade names used herein are indicated by a ™ symbol or ® symbol, indicating that the names may be protected by certain trademark rights, e.g., they may be registered trademarks in various jurisdictions.

All patents and patent applications, test procedures (such as ASTM methods, UL methods, and the like), and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The invention has been described above with reference to numerous embodiments and specific examples. Particularly preferred embodiments include: An apparatus for oligomerization or polymerization comprising a first fixed catalyst bed packed with a first catalyst arranged in series with a second fixed catalyst bed packed with a second catalyst, wherein said first and second catalysts are different and wherein said unit is further characterized by independent temperature control of said first and second catalyst beds, preferably further characterized by the proviso that said apparatus comprises tubular reactors, at least one chamber reactor, or at least one tubular reactor and chamber reactor, wherein the apparatus, in preferred embodiment, may be further characterized by one or more of the following: wherein said first catalyst is characterized as different from said second catalyst by at least one of: (a) a different chemical formula; (b) different chemical elements; (c) different activity and/or selectivity profile in oligomerisation reactions; (d) different crystal structure; (e) different crystal size; (f) different surface treatment; (g) different sensitivity to sulfur; and more particularly wherein the "difference" is not a difference attributed solely to a factor caused by aging of the catalyst and/or wherein said difference is characterized when the two catalysts in question are fresh catalysts; wherein said first catalyst is selective for dimerization of C3-C5 olefins and said second catalyst is selective for adding a monomer unit to a dimer of said monomer unit; wherein said first catalyst bed comprises a first tubular reactor and said second catalyst bed comprises a second tubular reactor, and said independent temperature control comprises a first steam drum fluidly connected to said first tubular reactor and a second steam drum fluidly connected to said second tubular reactor; wherein said first catalyst bed and said second catalyst bed comprises a single chamber reactor, and said independent temperature control comprises quench into said second reactor; wherein said first reactor is a tubular reactor and second reactor is a chamber reactor; wherein said first reactor is a chamber reactor and second reactor is a tubular reactor; wherein said first tubular reactor and said second tubular reactor each comprises a shell-and-tube reactor and a steam drum and wherein a heat exchange fluid circulates via a first conduit from said shell-and-tube reactor to said drum and a second conduit from said drum to said shell-and-tube reactor, and wherein a portion of said fluid is removed from said reactor system and makeup fluid is added to said reactor system via a makeup fluid conduit; wherein said first catalyst and said second catalyst are selected from zeolites active for light olefin oligomerization and solid phosphoric acid (SPA); wherein said first catalyst bed is packed with a catalyst selected from zeolite catalysts active for olefin oligomerization and said second catalyst bed is packed with SPA catalyst; wherein said first catalyst bed is packed with a catalyst selected from zeolite catalysts active for olefin oligomerization and said second catalyst bed is packed with a catalyst selected from zeolite catalysts active for olefin polymerization; and also an oligomerization process carried out in an apparatus as described in this paragraph, including combinations of the preferred embodiments as would be apparent to one of ordinary skill in the art in possession of the present disclosure; and also a process comprising retrofitting a oligomerization unit comprising plural parallel reactors, including repiping at least two of said parallel reactors so that at least two catalyst beds are piped in series (again, including a resulting apparatus as suggested by any one limitation described in this paragraph or combinations of such limitations as would be apparent to one of ordinary skill in the art in possession of the present disclosure); and also in an oligomerization system comprising plural catalyst beds packed with catalysts, the improvement comprising packing a first catalyst bed with a first catalyst and a second catalyst bed with a second catalyst and arranging or piping said first reactor in series with said second reactor, with the proviso that said first catalyst is different from said second catalyst, and their respective catalyst beds are provided with independent temperature control, and also more preferably wherein said first catalyst is characterized as different from said second catalyst by at least one of: (a) a different chemical formula; (b) different chemical elements; (c) different activity and/or selectivity profile in oligomensation reactions; (d) different crystal structure; (e) different crystal size; (f) different surface treatment; (g) different sensitivity to sulfur, and/or wherein said plural catalyst beds each comprise a shell-and-tube reactor and a steam drum and wherein a heat exchange fluid circulates via a first conduit from said shell-and-tube reactor to said drum and a second conduit from said drum to said shell-and-tube reactor, and wherein a portion of said fluid is removed from said reactor system and makeup fluid is added to said reactor system via a makeup fluid conduit, or wherein said plural catalyst beds comprise at least one chamber reactor; and also a process for the oligomerization of light olefins to heavier olefins comprising contacting a feed comprising light olefins with an oligomerization catalyst under oligomerizing conditions in a reactor system and obtaining an oligomerization product comprising heavier olefins, wherein said reactor system comprises an apparatus according to any apparatus fairly suggested herein, especially wherein said light olefins comprise at least one olefin selected from C3 to C6 olefins and said heavier olefins comprise a product selected from dimers, trimers, tetramers, and mixtures thereof, of said at least one olefin (and particularly wherein the feed consists essentially of a C3 to C6 olefin feed, e.g, very little ethylene is present, such as less than 5 vol %, or less than 1 vol %, or less than 0.5 vol % based on the volume of the entire feed); and also in a process for the oligomerization of light olefins to heavier olefins in a tubular or chamber reactor, the improvement comprising providing at least two catalyst beds with independent temperature control wherein said at least two catalyst beds are packed with different catalysts, especially wherein said at least two catalyst beds include first fixed catalyst bed comprising a first catalyst and a second fixed catalyst bed comprising a second catalyst, with the proviso that said first catalyst is characterized as different from said second catalyst by at least one of: (a) chemical formula; (b) chemical elements; (c) activity and/or selectivity profile in oligomerization reactions; (d) crystal structure; (e) crystal size; (f) surface treatment; (g) sensitivity to sulfur (again, particularly wherein the difference is a difference not solely attributable to factors caused by aging); which may be further characterized, in a preferred embodiment, by a leading fixed catalyst bed packed with at least one catalyst selective for dimerization of monomer units selected from at least one C3-C5 olefins and a trailing fixed catalyst bed packed with at least one catalyst selective for adding said monomer unit to a dimer of said monomer unit; and also an oligomerization process comprising: in a first tubular reactor, contacting a feed comprising C3-C5 olefins with a catalyst selected from solid phosphoric acid (SPA) catalysts, nickel catalysts, titanium catalysts, and zeolite catalysts; in a second tubular reactor, contacting the effluent of the first reactor with a catalyst selected from solid phosphoric acid (SPA) catalysts, nickel catalysts, titanium catalysts, and zeolite catalysts; and independently controlling the temperature of the two reactors (such as by separate steam drums), and preferable wherein the catalyst in the first and/or second reactor is a zeolite catalyst selected from one or more of the following: ZSM-5, ZSM-22, ZSM-23, ZSM-35, ZSM-57, MCM-22, MCM-23, MCM-41, MCM-49, and MCM-56, or still more preferably wherein the catalyst in the first reactor is ZSM-22, and/or wherein the catalyst in the second reactor is ZSM-57. However, many variations will suggest themselves to those skilled in this art in light of the above detailed description. All such obvious variations are within the full intended scope of the appended claims.

What is claimed is:

1. An apparatus for oligomerization or polymerization comprising a first fixed catalyst bed packed with a first catalyst arranged in series with a second fixed catalyst bed packed with a second catalyst, wherein said first and second catalysts are different and wherein said apparatus is further characterized by independent temperature control of said first and second catalyst beds, wherein said first catalyst bed comprises a first tubular reactor and said second catalyst bed comprises a second tubular reactor, and said independent temperature control comprises a first steam drum fluidly connected to said first tubular reactor and a second steam drum fluidly connected to said second tubular reactor, and wherein said first catalyst and said second catalyst are selected from zeolites active for light olefin oligomerization and solid phosphoric acid (SPA).

2. The apparatus of claim 1, wherein said first catalyst is characterized as different from said second catalyst by at least one of: (a) a different chemical formula; (b) different chemical elements; (c) different activity and/or selectivity profile in oligomerisation reactions; (d) different crystal structure; (e) different crystal size; (f) different surface treatment; (g) different sensitivity to sulfur.

3. The apparatus of claim 1, wherein said first catalyst is selective for dimerization of C3-C5 olefins and said second catalyst is selective for adding a monomer unit to a dimer of said monomer unit.

4. The apparatus of claim 1, wherein said first catalyst bed is packed with a catalyst selected from zeolite catalysts active for olefin oligomerization and said second catalyst bed is packed with SPA catalyst.

5. The apparatus of claim 1, wherein said first catalyst bed is packed with a catalyst selected from zeolite catalysts active for olefin oligomerization and said second catalyst bed is packed with a catalyst selected from zeolite catalysts active for olefin polymerization.

* * * * *